United States Patent [19]

Fancher

[11] 3,912,497

[45] Oct. 14, 1975

[54] PLANT GROWTH REGULATOR

[75] Inventor: Llewellyn W. Fancher, Orinda, Calif.

[73] Assignee: Stauffer Chemical Company, Westport, Conn.

[22] Filed: May 12, 1970

[21] Appl. No.: 36,702

[52] U.S. Cl. .......................... 71/104; 71/72; 71/76; 71/78
[51] Int. Cl.² ............................................ A01N 9/20
[58] Field of Search ................................. 71/104, 76

[56] References Cited
FOREIGN PATENTS OR APPLICATIONS
160,160  12/1954  Australia.............................. 71/104

Primary Examiner—Lewis Gotts
Assistant Examiner—Catherine L. Mills
Attorney, Agent, or Firm—Michael J. Bradley

[57] ABSTRACT

The use of cinnamyl thiocyanate as a plant growth regulator is disclosed.

2 Claims, No Drawings

PLANT GROWTH REGULATOR

BACKGROUND OF THE INVENTION

This invention relates to a method of regulating the growth of plants. More particularly, the invention relates to the use of cinnamyl thiocyanate as a plant growth regulator.

Although the preparation of cinnamyl thiocyanate is described by Bergman in the *Journal of the Chemical Society*, Pages 1361–1362 (1935), no indication of biological activity is given. It has now been discovered that this compound is an effective plant growth regulator.

The term "plant growth regulator" or variants thereof, and as employed throughout the specification and claims, is used to describe those materials which exhibit certain effects on the growth habits of plants, which may include, but is not limited thereto, dwarfing or stunting, regulation of the onset of flowering and the number of flowers produced, regulation of amount of fruit set, defoliation, reduction or inhibition of lateral growth, and shortening of internodes. Plant growth regulators, for example, may be used as stunting agents on grasses, thus allowing extended periods between grass cutting, while maintaining favorable landscape conditions. On certain crop species, greater pod yield allows increased production.

SUMMARY OF THE INVENTION

The following examples are indicative of the manner in which the invention is practiced.

EXAMPLE I

Metal flats were filled with loamy sand soil and sown with seeds of the crops, both grasses and broadleaf, indicated below in the table. Cinnamyl thiocyanate was applied at a rate of about 5 pounds per acre, 10 days after sowing. The compound was applied by mixing 750 mg. of the test compound in 100 milliliters of a 50/50 water, acetone solution containing 1% Tween 20 (polyoxyethylene sorbitan monolaurate). Ratings were taken approximately 2 weeks after application of the test compound by comparing growth of the treated plant foliage with untreated controls. The results are shown in the table below:

TABLE I

| TYPE OF REGULATION AND EXTENT | | |
|---|---|---|
| Corn (Zea Mays L.) | Milo (Sorghum) | Cotton (Gossypium hirsutum L.) |
| Stunting 70% | Stunting 60% | Stunting 30% |

EXAMPLE II

The procedure employed in this example was similar to that of Example I, except that the test compound was applied at a rate of about 2 pounds per acre to soybeans (Grycine max.) in the first trifoliate stage. After 3 weeks, the soybeans were severely stunted and apical dominance was broken. At 6 weeks the plants exhibited a large increase in the number of pods as compared with controls.

As may be seen by the test results, cinnamyl thiocyanate is useful in regulating the growth habits of plants. Preferably, the compound is applied directly to the plants to be modified, although it may also be applied to a locus before emergence of the species to be regulated. It is necessary, of course, that the plants or locus receive an effective or regulating amount, i.e., an amount sufficient to give the desired plant growth regulating effect. On the other hand, excessive amounts, as is the case with most plant growth regulators, may result in phytotoxicity on some plant species. Again, since the amount of the active agent required will vary to some extent, depending on the plant treated, precise limits on the amounts employed cannot be given. The tests set forth above indicate exemplary amounts which may be used, as will readily be appreciated by those of skill in Determination of the optimum effective concentration for a specific application is readily conducted by routine procedures, as will also be apparent to those skilled in the art.

The material is normally employed with a suitable carrier and may be applied as a dust, spray, drench or aerosol. The compound thus may be applied in combination with solvents, diluents, various surface active agents (for example detergents, soaps, or other emulsifying or wetting agents, surface active clays) carrier media, adhesives, spreading agents, humectants and the like. It may also be combined with other biologically active compositions, including fungicides, bactericides, and algaecides, insecticides, etc., as well as with fertilizers, soil modifiers, etc. The cinnamyl thiocyanate may be used in combination with an inert carrier and a surface active or emulsifying agent. The solid and liquid formulations can be prepared by any of the conventional methods well-known by those skilled in the art.

Various changes and modifications may be made without departing from the spirit and the scope of the invention described herein, as will be apparent to those skilled in the art to which it pertains.

I claim:

1. A method of regulating the growth habit of plants comprising applying to the plants or a locus to be regulated an effective amount of cinnamyl thiocyanate.

2. A method of stunting the growth of plants comprising applying to the plants, or to a locus where stunting is desired, an amount of cinnamyl thiocyanate sufficient to cause stunting.

* * * * *